US010000403B2

(12) United States Patent
Kanagawa et al.

(10) Patent No.: US 10,000,403 B2
(45) Date of Patent: Jun. 19, 2018

(54) ORGANIC-WASTE-PROCESSING APPARATUS, PROCESSING METHOD, AND CONTROL APPARATUS

(71) Applicant: Metawater Co., Ltd., Tokyo (JP)

(72) Inventors: Takaaki Kanagawa, Tokyo (JP); Yoshimasa Tomibe, Tokyo (JP); Koki Sato, Tokyo (JP); Kosuke Kamiya, Tokyo (JP); Masuo Inoue, Tokyo (JP)

(73) Assignee: Metawater Co., Ltd., Chiyoda-Ku (JP)

(*) Notice: Subject to any disclaimer, the term of this patent is extended or adjusted under 35 U.S.C. 154(b) by 763 days.

(21) Appl. No.: 14/499,330

(22) Filed: Sep. 29, 2014

(65) Prior Publication Data

US 2015/0014230 A1 Jan. 15, 2015

Related U.S. Application Data

(63) Continuation of application No. PCT/JP2013/059734, filed on Mar. 29, 2013.

(30) Foreign Application Priority Data

Mar. 30, 2012 (JP) .................. 2012-082842

(51) Int. Cl.
| | |
|---|---|
| B01D 21/30 | (2006.01) |
| C02F 11/12 | (2006.01) |
| C02F 1/00 | (2006.01) |
| C02F 11/06 | (2006.01) |
| F23G 5/04 | (2006.01) |
| F23G 5/12 | (2006.01) |
| F23G 5/30 | (2006.01) |

(Continued)

(52) U.S. Cl.
CPC .............. *C02F 11/12* (2013.01); *C02F 1/008* (2013.01); *C02F 11/06* (2013.01); *F23G 5/04* (2013.01);

(Continued)

(58) Field of Classification Search
None
See application file for complete search history.

(56) References Cited

U.S. PATENT DOCUMENTS

2004/0011121 A1  1/2004  Ashe et al.
2006/0260190 A1  11/2006  Miyoshi et al.

FOREIGN PATENT DOCUMENTS

GB   2 348 270 A   9/2000
JP   54-120964 A   9/1979

(Continued)

OTHER PUBLICATIONS

Extended European Search Report (Application No. 13770127.2) dated Oct. 13, 2015.

(Continued)

*Primary Examiner* — Richard C Gurtowski
(74) *Attorney, Agent, or Firm* — Burr & Brown, PLLC

(57) ABSTRACT

An organic-waste-processing apparatus reducing a moisture of, and conducting a thermal operation process to, an organic waste, includes: a moisture-reducing unit; a combustion unit; a combustion-energy-supply unit; an energy-supply-operation controller; an organic-waste-energy-estimating unit; a total-energy-consumption measuring unit; a relation-maintaining unit; a quantitative-relationship-grasping unit; and a moisture reduction controller. The moisture reduction controller controls an operation of the moisture-reducing unit so that the estimated value of the organic waste energy to be estimated by the organic-waste-energy-estimating unit is directed in a direction reducing a quantitative difference from the optimum value of the organic waste energy based on the quantitative relationship grasped by the quantitative-relationship-grasping unit between the optimum value of the organic waste energy and the latest estimated value of the organic waste energy.

9 Claims, 10 Drawing Sheets

(51) Int. Cl.
  *F23G 5/50* (2006.01)
  *F23G 7/00* (2006.01)
  *G05B 15/02* (2006.01)
  *G06Q 10/00* (2012.01)

(52) U.S. Cl.
  CPC ............. *F23G 5/12* (2013.01); *F23G 5/30* (2013.01); *F23G 5/50* (2013.01); *F23G 7/001* (2013.01); *G05B 15/02* (2013.01); *G06Q 10/30* (2013.01); *C02F 2303/10* (2013.01); *F23G 2201/20* (2013.01); *F23G 2207/20* (2013.01); *F23G 2207/30* (2013.01); *F23G 2207/40* (2013.01); *F23G 2900/55011* (2013.01); *Y02E 20/12* (2013.01); *Y02W 10/30* (2015.05); *Y02W 10/40* (2015.05); *Y02W 90/20* (2015.05)

(56) References Cited

FOREIGN PATENT DOCUMENTS

| | | |
|---|---|---|
| JP | 57-082609 A | 5/1982 |
| JP | 57-207722 A1 | 12/1982 |
| JP | 60-064117 A | 4/1985 |
| JP | 11-082971 A | 3/1999 |
| JP | 2000-202495 A | 7/2000 |
| JP | 2001-029999 A | 2/2001 |
| JP | 2002-273495 A | 9/2002 |
| JP | 2006-002945 A | 1/2006 |
| JP | 2011-214773 A | 10/2011 |
| JP | 2011-220668 A | 11/2011 |

OTHER PUBLICATIONS

International Search Report and Written Opinion, International Application No. PCT/JP2013/059734, dated Jul. 2, 2013 (10 pages).

ORGANIC-WASTE-PROCESSING APPARATUS, PROCESSING METHOD, AND CONTROL APPARATUS

CROSS-REFERENCE TO RELATED APPLICATIONS

This application is a continuation of PCT International Application No. PCT/JP2013/059734 filed on Mar. 29, 2013 which claims the benefit of priority from Japanese Patent Application No. 2012-082842 filed on Mar. 30, 2012, the entire contents of which are incorporated herein by reference.

BACKGROUND OF THE INVENTION

1. Field of the Invention

The present invention relates to an organic-waste-processing apparatus conducting, by a thermal operation equipment, a thermal operation process to an organic waste moisture-reduced by a moisture-reducing equipment, and relates to a processing method and a control apparatus.

2. Description of the Related Art

Sludge or the like produced by a sewage treatment plant or the like is dehydrated by a sludge dehydrator such as a belt-press dehydrator or a centrifugal dehydrator or the like, and adjusted as a predetermined moisture content of dehydrated sludge. The adjusted and dehydrated sludge is incinerated by an incinerator. It is preferable that the predetermined moisture content is set to ensure that no auxiliary fuel is used in an incinerator from a viewpoint of energy efficiency of the thermal operation equipment.

Japanese Laid-open Patent Publication No. 2002-273495 (hereinafter to be referred to as Patent Literature 1) discloses a sludge dehydration apparatus measuring a moisture content and a percentage of contained organic of a dehydrated sludge at an exit of the sludge dehydration apparatus so that the dehydrated sludge is subject to a spontaneous heat combustion (spontaneous combustion) without using an auxiliary fuel even if the percentage of contained organic of the dehydrated sludge fluctuates, calculating, based on a combustion curve satisfying a spontaneous combustion condition and the measured percentage of contained organic, a moisture content satisfying the spontaneous combustion condition, and setting an optimum dehydration ratio for the sludge dehydration apparatus by comparing the calculated moisture content with the measured moisture content.

SUMMARY OF THE INVENTION

It is an object of the present invention to at least partially solve the problems in the conventional technology.

An organic-waste-processing apparatus according to one aspect of the present invention in which reducing a moisture of, and conducting a thermal operation process to, an organic waste, includes: a moisture-reducing unit reducing the moisture of the organic waste; a combustion unit combusting and reducing a weight of the organic waste moisture-reduced by the moisture-reducing unit by using a combustion energy; a combustion-energy-supply unit supplying the combustion energy, which is other than a combustion energy residing in the organic waste, into the combustion unit; an energy-supply-operation controller controlling an operation of the combustion-energy-supply unit so that an inside the combustion unit is maintained at a predetermined temperature at a supply amount of the combustion energy; an organic-waste-energy-estimating unit estimating an organic waste energy as the combustion energy residing in the organic waste based on a supply amount of the combustion energy as a result of a control by the energy-supply-operation controller; a total-energy-consumption measuring unit measuring a total energy consumption amount by measuring energy consumption amounts for a plurality of energy-consuming elements relating to the moisture reduction and the thermal operation process of the organic waste and totaling results of measuring the energy consumption amounts; a relation-maintaining unit maintaining a first correlation between the organic waste energy calculated in advance and the total energy consumption amount, a second correlation between the organic waste energy and a measured value of the total energy consumption amount obtained by correcting the first correlation continuously based on a third correlation between an estimated value of the organic waste energy estimated by the organic-waste-energy-estimating unit and a measured value of the total energy consumption amount measured by the total-energy-consumption measuring unit, or a fourth correlation between the organic waste energy and the total energy consumption amount obtained by structuring and correcting continuously by the third correlation, as a reference relationship between the organic waste energy and the total energy consumption amount; a quantitative-relationship-grasping unit grasping a quantitative relationship between an optimum value of the organic waste energy minimizing the total energy consumption amount and the latest estimated value of the organic waste energy based on the reference relationship maintained by the relation-maintaining unit between the organic waste energy and the total energy consumption amount and the latest estimated value of the organic waste energy estimated by the organic-waste-energy-estimating unit; and a moisture reduction controller controlling an operation of the moisture-reducing unit so that the estimated value of the organic waste energy to be estimated by the organic-waste-energy-estimating unit is directed in a direction reducing a quantitative difference from the optimum value of the organic waste energy based on the quantitative relationship grasped by the quantitative-relationship-grasping unit between the optimum value of the organic waste energy and the latest estimated value of the organic waste energy.

An organic-waste-processing method according to another aspect of the present invention in which reducing a moisture of, and conducting a thermal operation process to, an organic waste, includes steps of: reducing the moisture of the organic waste by a moisture-reducing unit; combusting and reducing a weight of the moisture-reduced organic waste by a combustion unit by using a combustion energy; supplying the combustion energy, which is other than a combustion energy residing in the organic waste, into the combustion unit; controlling a supply of the combustion energy so that an inside the combustion unit is maintained at a predetermined temperature at a supply amount of the combustion energy; estimating an organic waste energy as the combustion energy residing in the organic waste based on a supply amount of the combustion energy as a result of a control at the step of controlling the supply of the combustion energy; measuring a total energy consumption amount by measuring energy consumption amounts for a plurality of energy-consuming elements relating to the moisture reduction and the thermal operation process of the organic waste and totaling results of the energy consumption amounts; maintaining, in the controller, a first correlation between the organic waste energy calculated in advance and the total energy consumption amount, a second correlation between the organic waste energy and the total energy consumption amount obtained by correcting the first correlation continuously based on a third correlation between an estimated value of the organic waste energy estimated at the step of estimating the organic waste energy and a measured value of the total energy consumption amount measured at the step of measuring the total energy consumption amount, or a fourth correlation between the organic waste energy and the total energy consumption amount obtained by structuring and correcting continuously by the third correlation, as a reference relationship between the organic waste energy and the total energy consumption amount; grasping a quantitative relationship between an optimum value of the organic waste energy minimizing the total energy consumption amount and the latest estimated value of the organic waste energy based on the reference relationship maintained at the step of maintaining the relation between an organic waste energy and the total energy consumption amount and the latest estimated value of the organic waste energy estimated by the organic-waste-energy-estimating unit; and controlling an operation of the moisture-reducing unit so that the estimated value of the organic waste energy to be estimated at the step of estimating the organic waste energy is directed in a direction reducing a quantitative difference from the optimum value of the organic waste energy based on the quantitative relationship grasped at the step of grasping the quantitative relationship between the optimum value of the organic waste energy and the latest estimated value of the organic waste energy.

A control apparatus according to still another aspect of the present invention includes: an energy-supply-operation controller controlling an operation of a combustion-energy-supply unit supplying a fuel energy, which is other than a combustion energy residing in the organic waste, to a combustion unit so that an inside the combustion unit combusting the organic waste is maintained at a predetermined temperature at a supply amount of the combustion energy; an organic-waste-energy-estimating unit estimating an organic waste energy as the combustion energy residing in the organic waste based on a supply amount of the combustion energy as a result of a control by the energy-supply-operation controller; a total-energy-consumption measuring unit measuring a total energy consumption amount by measuring energy consumption amounts for a plurality of energy-consuming elements relating to the moisture reduction and the thermal operation process of the organic waste and totaling results of measuring the energy consumption amounts; a relation-maintaining unit maintaining a first correlation between the organic waste energy calculated in advance and the total energy consumption amount, a second correlation between the organic waste energy and the total energy consumption amount obtained by correcting the first correlation continuously based on a third correlation between an estimated value of the organic waste energy estimated by the organic-waste-energy-estimating unit and a measured value of the total energy consumption amount measured by the total-energy-consumption measuring unit, or a fourth correlation between the organic waste energy and the total energy consumption amount obtained by structuring and correcting continuously by the third correlation, as a reference relationship between the organic waste energy and the total energy consumption amount; a quantitative-relationship-grasping unit grasping a quantitative relationship between an optimum value of the organic waste energy minimizing the total energy consumption amount and the latest estimated value of the organic waste energy based on the reference relationship maintained by the relation-maintaining unit between an organic waste energy and the total energy consumption amount and the latest estimated value of the organic waste energy estimated by the organic-waste-energy-estimating unit; and a moisture reduction controller controlling an operation of the moisture-reducing unit so that the estimated value of the organic waste energy to be estimated by the organic-waste-energy-estimating unit is directed in a direction reducing a quantitative difference based on the quantitative relationship grasped by the quantitative-relationship-grasping unit between the optimum value of the organic waste energy and the latest estimated value of the organic waste energy.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE INVENTION

Figure 1:
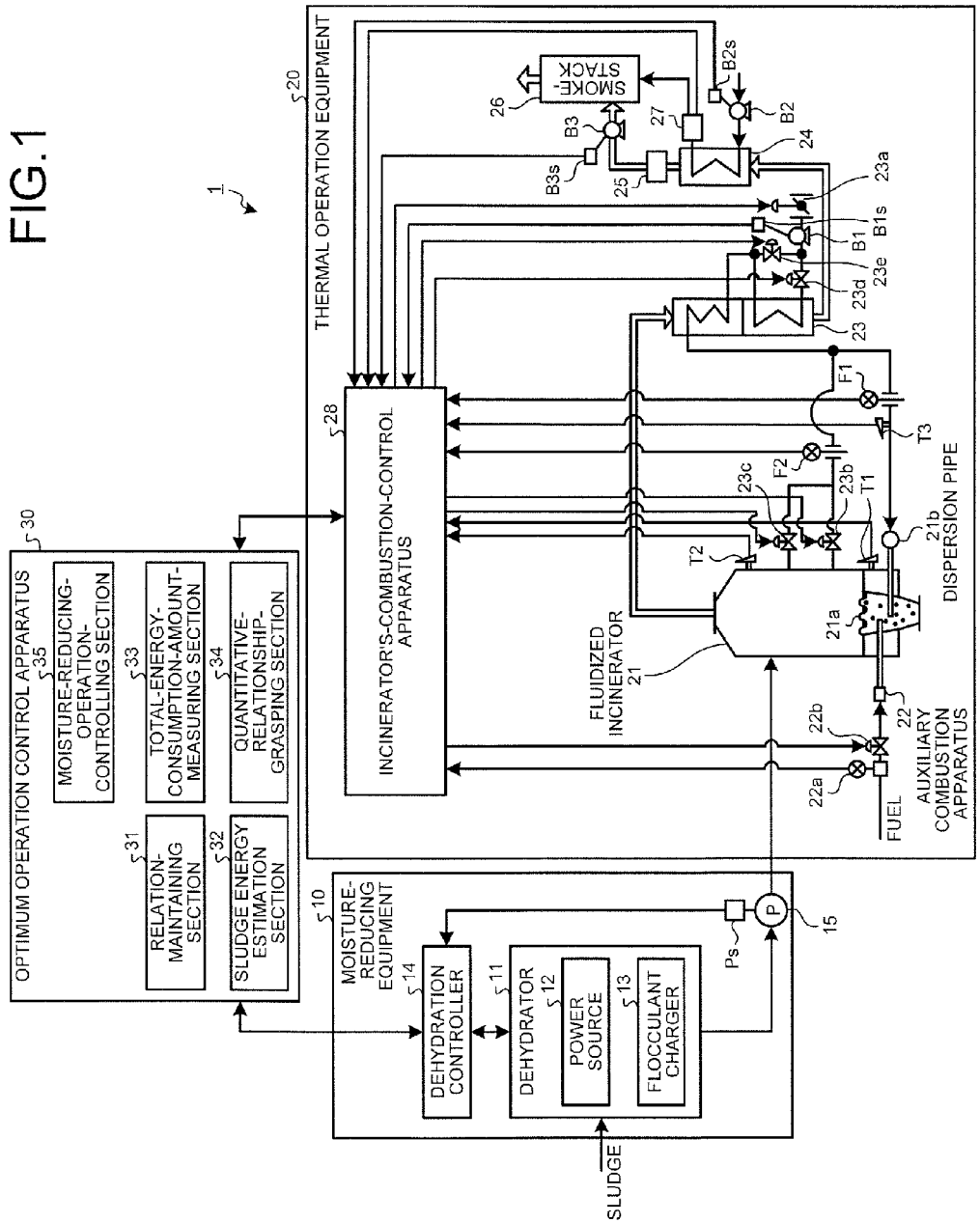
FIG. 1 is a block diagram illustrating a general configuration of a sludge-processing apparatus according to an embodiment of the present invention.

Hereafter an embodiment of the present invention is explained with reference to the drawings. Also, in each drawing, identical or equivalent elements are given same reference numerals. The present invention is not limited by the embodiment explained hereafter.

According to the technology described in the Patent Literature 1 above, the moisture content of the dehydrated sludge is adjusted so that the dehydrated sludge is in a spontaneous combustion state in the incinerator. However, even if the moisture content of the dehydrated sludge is in the spontaneous combustion state, the energy usage efficiency is not always optimum for the entire thermal operation equipment including a dehydrator.

The technology described in the Patent Literature 1 requires a measurement instrument separately for measuring an energy-related value, including a moisture content or percentage of contained organic of the dehydrated sludge, of organic waste such as sludge. Therefore, a technology has also been called for which is capable of optimization of the energy usage efficiency of the entire equipment without measuring the energy-related values such as the moisture content and the percentage of contained organic or the like of the organic waste.

In contrast, according to the embodiment described below, it is possible to provide an advantage that an organic-waste-processing apparatus, a processing method, and a control apparatus capable of reducing moisture in a processing apparatus and optimizing the energy usage efficiency of the entire thermal operation equipment without measuring the energy-related value of the organic waste to be incinerated.

To start with, an apparatus, as an organic-waste-processing apparatus according to an embodiment of the present invention, processing sludge such as sewage will be explained. FIG. 1 is a block diagram illustrating a general configuration of a sludge-processing apparatus according to the embodiment. As illustrated in FIG. 1, a sludge-processing apparatus 1 including an optimum-operation control system includes a moisture-reducing equipment 10, a thermal operation equipment 20, and an optimum operation control apparatus 30 as a control apparatus.

The moisture-reducing equipment 10 is configured to be capable of increasing and decreasing the moisture content of sludge as organic waste. The moisture-reducing equipment 10 includes a centrifugal dehydrator 11, as a moisture-reducing unit reducing moisture by dehydrating sludge, and a dehydration controller 14. A desiccator dehydrating sludge to reduce moisture or various apparatus capable of moisture reduction of sludge can be used as a moisture-reducing unit. The dehydration controller 14 controls the rotation rate of a power source 12 in the dehydrator 11, i.e., an increase and a decrease in the centrifugal force with a moisture-reducing-operation-controlling section 35 which will be explained later. The dehydrator 11 may be in another form of dehydrator such as a belt-press dehydrator or a filter press or the like, and alternatively may be a desiccator or the like dehydrating sludge to reduce moisture. The dehydrator 11 includes a power source 12, as an energy-consuming element such as a motor or the like, and a flocculant charger 13 charging polymer coagulant.

The moisture-reducing equipment 10 further includes a sludge supply pump 15 as an energy-consuming element and a wattmeter Ps. The sludge supply pump 15 supplies sludge dehydrated by the dehydrator 11 to a thermal operation equipment 20. The wattmeter Ps detects power consumed by the sludge supply pump 15 and put the detected power into a dehydration controller 14. The dehydration controller 14 puts out an energy consumption amount of the power source 12 and a power consumption amount, of the sludge supply pump 15, inputted by the wattmeter Ps to the optimum operation control apparatus 30, and controls an increase and a decrease in the rotation rate of the power source 12 in the dehydrator 11. The flocculant charger 13 charges a predetermined flocculant dose calculated in advance to sludge to be dehydrated.

A thermal operation equipment 20 is a thermal operation equipment conducting a thermal operation to the sludge. The thermal operation equipment 20 includes a fluidized incinerator 21 as a combustion unit, a combustion-energy-supply unit supplying combustion energy, which is other than combustion energy residing in the sludge, to the fluidized incinerator 21, and an incinerator's-combustion-control apparatus 28 as an energy-supply-operation-controlling unit.

The fluidized incinerator 21 incinerates, to reduce the amount of, sludge reduced in moisture by the dehydrator 11 by making use of combustion energy. The fluidized incinerator 21 is constituted by a freeboard section and a lower fluidized bed 21a. A dispersion pipe 21b is inserted into the fluidized bed 21a horizontally. Combustion air (flux air) is sent to air nozzles formed in the dispersion pipe 21b uniformly. The sludge as organic waste is fed to the fluidized bed 21a by the sludge supply pump 15 continuously. The sludge is decomposed and dehydrated by the fluidized bed 21a, incineration of a part of the sludge progresses. The freeboard section incinerates the sludge completely, and discharges a combustion gas and an ash content from an upper portion. In the fluidized incinerator 21, a thermosensor T1 detects a temperature of the fluidized bed 21a and a thermosensor T2 detects a temperature of an upper portion inside the fluidized incinerator 21. Results of the temperatures detected respectively are put into the incinerator's-combustion-control apparatus 28.

The auxiliary combustion apparatus 22 feeds an auxiliary fuel as combustion energy into the fluidized incinerator 21. The fuel amount detector 22a detects an auxiliary fuel consumption amount of the auxiliary combustion apparatus 22 as an energy-consuming element and put the detected result into the incinerator's-combustion-control apparatus 28. The supply amount of the auxiliary fuel is adjusted in accordance with an opening degree of a control valve 22b, and the auxiliary fuel is not fed if the sludge satisfies a spontaneous combustion condition. The result of detecting the fuel consumption amount of the auxiliary fuel is supplied to the incinerator's-combustion-control apparatus 28.

A flux air pre-heater 23 as an energy-consuming element conducts a heat exchange between flux air, inflowing from atmosphere by a flux blower B1 controlled in flow rate by a valve 23a, and a combustion gas. The flux air pre-heater 23 conducts a heat exchange between the flux air and the combustion gas with an upstream stage tower and a downstream stage tower. Of the flux air as combustion energy supplied from the flux air pre-heater 23 to the fluidized incinerator 21, a temperature is detected by a thermosensor T3, and a flow rate is detected by flow sensors F1 and F2. The results of detecting the temperature and the flow rate are put into the incinerator's-combustion-control apparatus 28 respectively. The temperature of the flux air is adjusted by changing the opening degrees of control valves 23e and 23e provided to a downstream of the flux blower B1. The temperature of the flux air may be adjusted by using a cooler constituted by a cooling fan or the like. The flux air heat-exchanged as described above are supplied to the fluidized bed 21a through the dispersion pipe 21b and supplied to the fluidized incinerator 21 through control valves 23b and 23c. Hereby an air ratio inside the fluidized incinerator 21 is adjusted and a temperature inside the fluidized incinerator 21 is adjusted.

The flux blower B1 as an energy-consuming element controlled by the incinerator's-combustion-control apparatus 28 consumes an approximately constant minimum power if the temperature inside the fluidized incinerator 21 is optimal, and on the other hand, if the temperature is low, the flux blower B1 consumes more power because combustion air for the auxiliary fuel is necessary. Since the amount of the combustion gas discharged from the fluidized incinerator 21 increases if the temperature inside the fluidized incinerator 21 exceeds the optimal state, power consumptions of the flux blower B1, a white-smoke-preventing fan B2 and an induction fan B3 which will be explained later increase. Power consumption amounts of the flux blower B1, the white-smoke-preventing fan B2, and the induction fan B3 as energy-consuming elements are detected by wattmeters B1s, B2s, and B3s respectively, and put into the incinerator's-combustion-control apparatus 28 respectively.

Amounts of heat of the above-described auxiliary fuel and the flux air become combustion energy other than combustion energy residing in the sludge. A combustion-energy-supply unit is configured by the auxiliary combustion apparatus 22 provided with the above-described control valve 22a, the flux air pre-heater 23 connected with the flux blower B1, the valve 23a, and the control valves 23b to 23e, and the dispersion pipe 21b.

The flow rates of the flux air detected by the above-described flow sensors F1 and F2 and the value of the measured temperature of the flux air detected by the thermosensor T3 are supplied from the incinerator's-combustion-control apparatus 28 to the optimum operation control apparatus 30. The optimum operation control apparatus 30 controls the power source 12 of the dehydrator 11 in accordance with the amount of the combustion energy including the flow rate and the temperature of the flux air and being supplied to the fluidized incinerator 21. The moisture-reducing equipment 10 controls the moisture content of the sludge by increasing and decreasing the rotation rate of the power source 12 controlled by the moisture-reducing-operation-controlling section 35 of the optimum operation control apparatus 30, thereby increases and decreases the sludge energy value. The control by the optimum operation control apparatus 30 will be explained later in detail.

The combustion gas heat-exchanged by the flux air pre-heater 23 is supplied to the white-smoke-preventing pre-heater 24 at an approximately 500 to 600° C. of temperature, and heat is exchanged between white-smoke-preventing air inputted from an atmosphere inputted by the white-smoke-preventing fan B2 as an energy-consuming element from an atmosphere and combustion gas. The white-smoke-preventing air increased in temperature by the white-smoke-preventing pre-heater 24 is regenerated thermally via a heat-recovery-and-power-generation equipment 27 as an energy-consuming element, and then supplied to a smokestack 26. Combustion gas outputted from the white-smoke-preventing pre-heater 24 is subject to a flue-gas treatment by a scrubber 25, and then put out to the smokestack 26. The combustion gas put into the smokestack 26 is increased in temperature by white-smoke-preventing air sent from the heat-recovery-and-power-generation equipment 27, and combustion gas preventing white smoke is emitted into an atmosphere. The heat-recovery-and-power-generation equipment 27 as an example of a heat-recovery-and-power-generation power equipment including a heat-regeneration-and-power equipment generates power by driving a turbine or the like by making use of regenerated heat, and the generated power is used by the sludge-processing apparatus 1 or other equipment. The amount of thermally-regenerated power generated by the heat-recovery-and-power-generation equipment 27 is put into the incinerator's-combustion-control apparatus 28.

The incinerator's-combustion-control apparatus 28 controls operations of the auxiliary combustion apparatus 22 and the flux air pre-heater 23 so that a combustion temperature inside the fluidized incinerator 21 is maintained at an approximately constant predetermined temperature even though a minute fluctuation of temperature occurs. The incinerator's-combustion-control apparatus 28 puts out the fuel consumption amount detected by the fuel amount detector 22a, each of the power consumption amounts of the flux blower B1, the white-smoke-preventing fan B2, and the induction fan B3, and the amount of thermally-regenerated power of the heat-recovery-and-power-generation equipment 27 to the optimum operation control apparatus 30. The incinerator's-combustion-control apparatus 28 controls incineration of the sludge by adjusting the control valves 23b to 23e based on results of detections by the thermosensors T1 to T3 and the flow sensors F1 and F2.

The optimum operation control apparatus 30 has a relation-maintaining section 31 as a relation-maintaining unit maintaining a relationship between a sludge energy relating to moisture reduction and thermal operation of the sludge and an amount used by a plurality of energy-consuming elements per a plurality of elements and a correlation between the sludge energy and total values of the amount used by each of the energy-consuming elements (total energy consumption amount).

The optimum operation control apparatus 30 has a sludge energy estimation section 32 as a sludge-energy-estimating unit estimating sludge energy as a part of combustion energy residing in the sludge and being supplied to the fluidized incinerator 21. The sludge energy estimation section 32 calculates a sludge energy value from Equation (1) below indicating a total heat amount of the fluidized incinerator 21 and Equation (2) indicating a total heat amount of the combustion energy based on a principle that these total heat amounts are the same. The estimated sludge energy value is estimated as a sludge energy value $E_{es}$ at that point.

Total Heat Amount of the Fluidized Incinerator 21

Total heat amount=exhaust gas amount×specific heat of exhaust gas×temperature of exhaust gas (1)

Total Heat Amount by Combustion Energy (Energy of Flux Air, Sludge Energy, and Energy of Auxiliary Fuel) Supplied to Fluidized Incinerator 21

Total heat amount=mass of sludge×sludge energy (amount of heat per unit mass)+mass of auxiliary fuel×amount of heat per unit mass+flux air amount×specific heat of flux air×temperature of flux air (2)

In these Equation (1) and Equation (2), the amount of heat discharged by the fluidized incinerator 21 or oxygen temperature or the like are employed if necessary as compensated values.

Herein it is sludge energy=(solid component combustion heat)−(latent heat in moisture in sludge+latent heat in moisture generated by sludge's combustible components). The total energy consumption amount has a dependency determined uniquely relative to the sludge energy per unit volume and has a minimum value. On the other hand, the sludge energy per unit volume changes in accordance with property of the sludge and is difficult to be controlled by detecting its sludge energy value while having a relationship of monotonically decreasing relative to an increase in the moisture content of the sludge. Hereby it is possible to decrease and increase the respective sludge energy values by increasing and decreasing the moisture content of the sludge. By making use of this relationship, it is possible to control the sludge energy value of the sludge so that the total energy consumption amount is minimized by increasing and decreasing the moisture content of the sludge. In this case, the moisture-reducing equipment 10, particularly the dehydrator 11 is controlled in a direction of increasing or decreasing the moisture content of the sludge so that the total energy consumption amount is converged to the minimum value of the sludge energy value. The moisture content of the sludge in this state does not have to be measured directly. Since it is not necessary to provide a detecting system and a control system for the moisture content of the sludge or to provide a detecting system and a control system for the sludge energy value, the configuration can be simplified.

The optimum operation control apparatus 30 has a total-energy-consumption-amount-measuring section 33 as a total-energy-consumption amount measuring unit measuring each of energy consumption amounts per a plurality of energy-consuming elements relating to moisture reduction and thermal operation process of the sludge and calculating the total energy consumption amount by totaling each of the measured energy consumption amounts.

Figure 2:
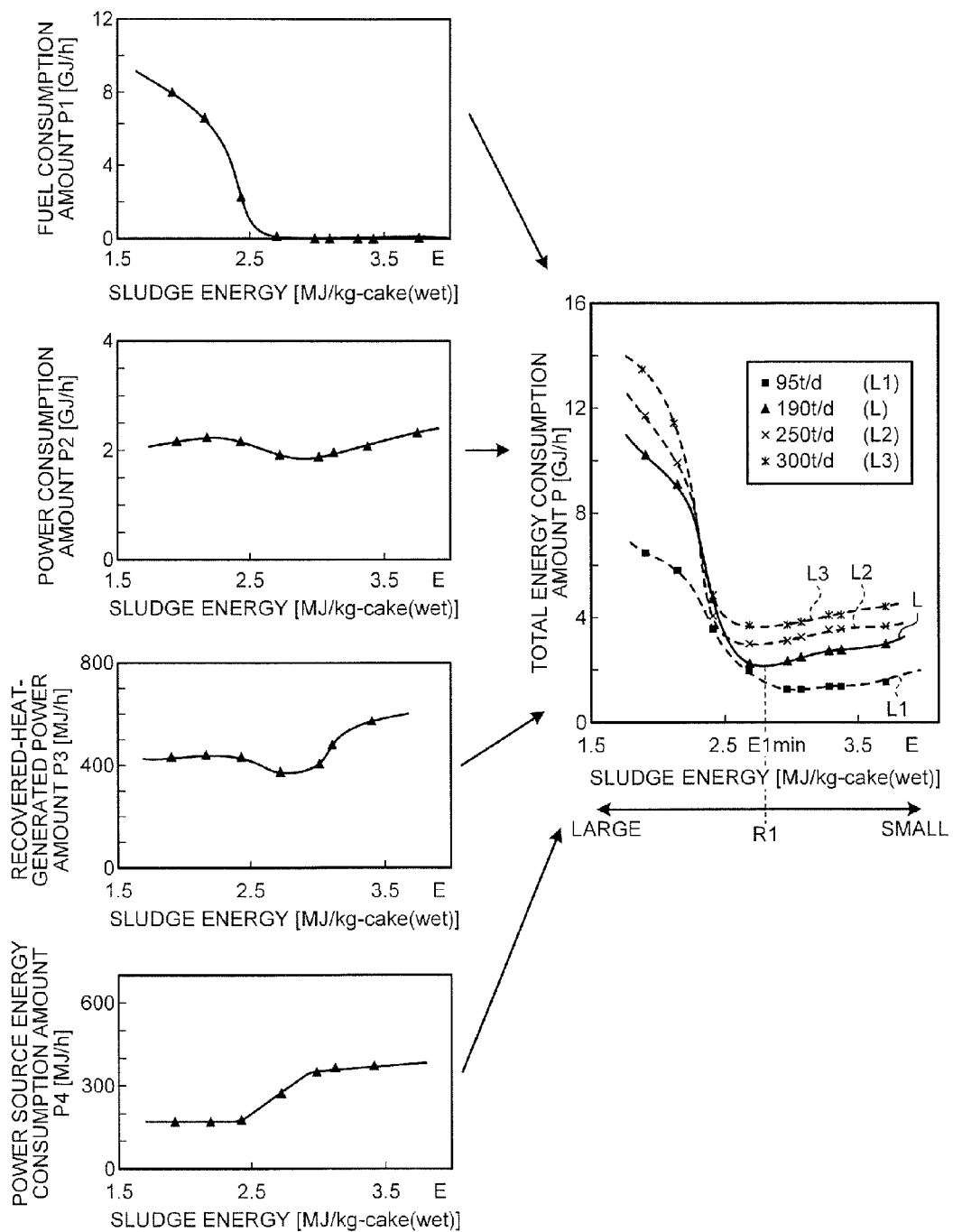
FIG. 2 is a diagram showing general scheme of an optimum-operation control process according to the embodiment of the present invention.

The relation-maintaining section 31 maintains a correlation between the sludge energy and the total energy consumption amount obtained by calculation by the optimum operation control apparatus 30 and shown in, for example, FIG. 2. The relation-maintaining section 31 maintains the correlation between the sludge energy and the total energy consumption amount, as a reference relationship between the total energy consumption amount and the sludge energy, obtained by correcting and updating the correlation between the sludge energy obtained by this calculation and the total energy consumption amount in accordance with the correlation between the estimated value of the sludge energy estimated by the sludge energy estimation section 32 and the total energy consumption amount measured by the total-energy-consumption-amount-measuring section 33 point by point. Furthermore, the relation-maintaining section 31 maintains the correlation between the sludge energy and the total energy consumption amount as a reference relationship between the total energy consumption amount and the sludge energy obtained by structuring and correcting the correlation between the estimated value of the sludge energy estimated by the sludge energy estimation section 32 from the beginning of operation of the sludge-processing apparatus 1 and the measured value of the total energy consumption amount measured by the total-energy-consumption-amount-measuring section 33 point by point without calculating the correlation between the sludge energy and the total energy consumption amount as shown in FIG. 2.

The optimum operation control apparatus 30 has a quantitative-relationship-grasping section 34 grasping a quantitative relationship of a sludge energy value $E_{es}$ relative to an optimum value Emin for the sludge energy minimizing a total energy consumption amount P based on the reference relationship between the sludge energy maintained by the relation-maintaining section 31 and the total energy consumption amount and the sludge energy value $E_{es}$ that is the latest estimated value estimated by the sludge energy estimation section 32 at the current point.

The optimum operation control apparatus 30 further has a moisture-reducing-operation-controlling section 35 controlling the dehydrator 11 of the moisture-reducing equipment 10. The moisture-reducing-operation-controlling section 35 controls increase or decrease in the rotation rate of the power source 12 of the dehydrator 11, i.e., an increase or a decrease in a centrifugal force, by feeding a control signal to the dehydration controller 14, thereby to control an increase or a decrease in the moisture content of the sludge to be subject to dehydration treatment.

The optimum operation control apparatus 30 obtains amounts of consumptions at a plurality of current energy-consuming elements such as the above-described fuel consumption amount or power consumption amount or the like, and instructs to the moisture-reducing-operation-controlling section 35 to increase or decrease the amount of power consumed by the dehydrator 11 so that the sludge energy is directed to an optimum value E1min at which the total energy consumption amount measured by the total-energy-consumption-amount-measuring section 33 is minimized, that is the sludge energy is directed to a direction in which the quantitative relationship between the optimum value E1min of the sludge energy grasped by the quantitative-relationship-grasping section 34 and the sludge energy value $E_{es}$ is resolved, based on the reference relationship maintained by the relation-maintaining section 31 and the sludge energy value $E_{es}$ that is the latest estimated value estimated by the sludge energy estimation section 32.

To be more specific, as shown in FIG. 2, the relation-maintaining section 31 of the optimum operation control apparatus 30 maintains a relationship between the fuel consumption amount P1 as an amount of the auxiliary fuel consumed by the energy-consuming element and detected by the fuel amount detector 22a and the sludge energy, a relationship between a power consumption amount P2 as total amounts of power consumed by the flux blower B1, the white-smoke-preventing fan B2, and the induction fan B3 as the energy-consuming elements and the sludge energy, a relationship between an thermally-regenerated power amount P3 consumed by the energy-consuming element of the heat-recovery-and-power-generation equipment 27 and the sludge energy, and a relationship between a power source's energy-consumption amount P4 consumed by the energy-consuming element of the power source 12, and maintains a reference relationship between a total energy consumption amount P (=P1+P2+P4−P3) obtained by adding the fuel consumption amount P1, the power consumption amount P2, and the power source's energy-consumption amount P4 and subtracting the thermally-regenerated power amount P3 and the sludge energy.

In the relationship between the fuel consumption amount P1 and the sludge energy, if the sludge energy is larger, it is a spontaneous combustion state in which the fuel consumption amount P1 is zero. If the sludge energy is larger than the thermally-regenerated power amount P3 (if a moisture content R is smaller), since the combustion temperature increases, and thereby the temperature of the combustion gas increases, an amount of heat regenerated increases, thus, the amount of power generated increases. The power source's energy-consumption amount P4 decreases since, if the sludge energy is smaller (the moisture content R is larger), the rotation rate of the power source 12 of the dehydrator 11 decreases. The power consumption amount P2 may be an actual power consumption amount as an amount consumed by the energy-consuming element from which the thermally-regenerated power amount P3 is subtracted in advance. The sludge supply pump 15 may be provided at a side of the thermal operation equipment 20, and in this case, the amount of power of the power consumption amount P2 consumed by the sludge supply pump 15 is put into the incinerator's-combustion-control apparatus 28.

Figure 3:
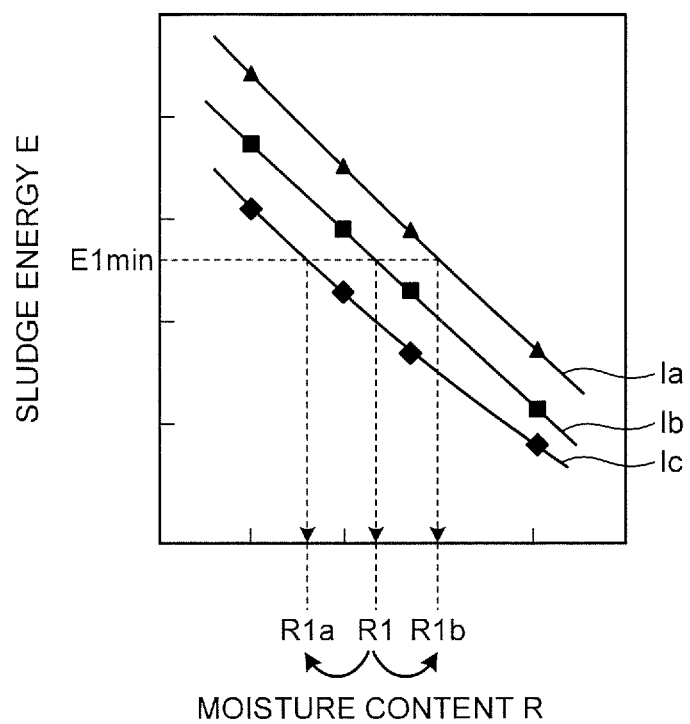
FIG. 3 is a diagram showing a relationship between sludge energy and moisture content when conducting an optimum-operation control process according to the embodiment of the present invention.

As described above, the total energy consumption amount P takes the minimum value at the sludge energy value E1min. On the other hand, as described above, the sludge energy E has a relationship of monotonically decreasing relative to an increase in the moisture content R of the sludge. Herein if the sludge energy value varies in accordance with a property of the sludge being inputted, the sludge energy value E1min cannot be maintained, and thus, the total energy consumption amount P cannot maintain the minimum value. To be more specific, as shown in FIG. 3, in a relationship between the sludge energy E per unit volume of the inputted sludge and the moisture content, three sludge characteristics Ia, Ib, and Ic exist of which sludge energy values decrease in this order relative to a same moisture content. For example, the sludge characteristics Ia, Ib, and Ic are of 90%, 85%, and 80% in combustible component ratios.

A case is considered in which Ib indicates an initially expected sludge characteristics Ib, the total energy consumption amount P relative to the sludge in this state is the minimum at the sludge energy value E1min, and R1 indicates the moisture content in this state. If the sludge characteristics vary to Ic, since the sludge energy per unit volume decreases, the total energy consumption amount P becomes larger than the minimum value. Therefore, the optimum operation control apparatus 30 controls the dehydration controller 14 to conduct a dehydration of decreasing the current moisture content R1 to cause the sludge energy value per unit volume to become close to E1min. In this case, as a result, the value of the moisture content of the sludge causing the sludge energy value to be of E1min is R1a(<R1). On the contrary, if the sludge characteristics vary to Ia, since the sludge energy per unit volume increases, the total energy consumption amount P becomes larger than the minimum value. Therefore, the optimum operation control apparatus 30 controls the dehydration controller 14 to conduct a dehydration of increasing the current moisture content R1 to cause the sludge energy value per unit volume to become close to E1min. In this case, as a result, the value of the moisture content of the sludge causing the sludge energy value to be of E1min is R1b(>R1).

The relationship between the fuel consumption amount P1 or the power consumption amount P2 and the sludge energy, or the relationship between the total energy consumption amount P and the sludge energy varies in accordance with an amount of the sludge charged into the fluidized incinerator 21. In FIG. 2, a curve L indicates 190 t/day of sludge-charging amount. In addition, in the relationship between the total energy consumption amount P and the sludge energy shown in FIG. 2, a curve L1 indicates 95 t/day, a curve L2 indicates 250 t/day, and a curve L3 indicates 300 t/day. Therefore, in a case where the sludge-charging amount varies, the moisture-reducing equipment 10 is controlled based on the relationship corresponding to the sludge-charging amount.

That is, the relationship between the total energy consumption amount P and the sludge energy varies variously in accordance with the variation of the charging amount. To address this, the optimum operation control apparatus 30 corrects appropriately, and updates, the relationship between the total energy consumption amount P calculated in advance and the sludge energy shown in FIG. 2 based on a correlation between the total energy consumption amount P measured by the total-energy-consumption-amount-measuring section 33 and the sludge energy value $E_{es}$ estimated by the sludge energy estimation section 32 at this point, and constantly updates the reference relationship between the total energy consumption amount P and the sludge energy.

To be more specific, the relationship between the total energy consumption amount P and the sludge energy can be applied in more detail by subdividing the sludge-charging amount into more detail and causing the relation-maintaining section 31 of the optimum operation control apparatus 30 to store therein various relationship between the total energy consumption amount P and the sludge energy. In addition, since the fuel consumption amount P1, the power consumption amount P2, the thermally-regenerated power amount P3, and the power source's energy-consumption amount P4 vary successively while the sludge-processing apparatus is being operated, the relationship between the total energy consumption amount P and the sludge energy varies successively. To address this, the total-energy-consumption-amount-measuring section 33 of the optimum operation control apparatus 30 measures the fuel consumption amount P1, the power consumption amount P2, the thermally-regenerated power amount P3, and the power source's energy-consumption amount P4 successively to calculate the total energy consumption amount P successively. The total-energy-consumption-amount-measuring section 33 updates the graph of the curve L indicating the relationship between the total energy consumption amount P and the sludge energy initially stored by the relation-maintaining section 31 successively, and calculates the sludge energy E1min minimizing the total energy consumption amount P. The relation-maintaining section 31 updates, and maintains therein, the reference relationship between the total energy consumption amount P and the sludge energy.

Figure 4:
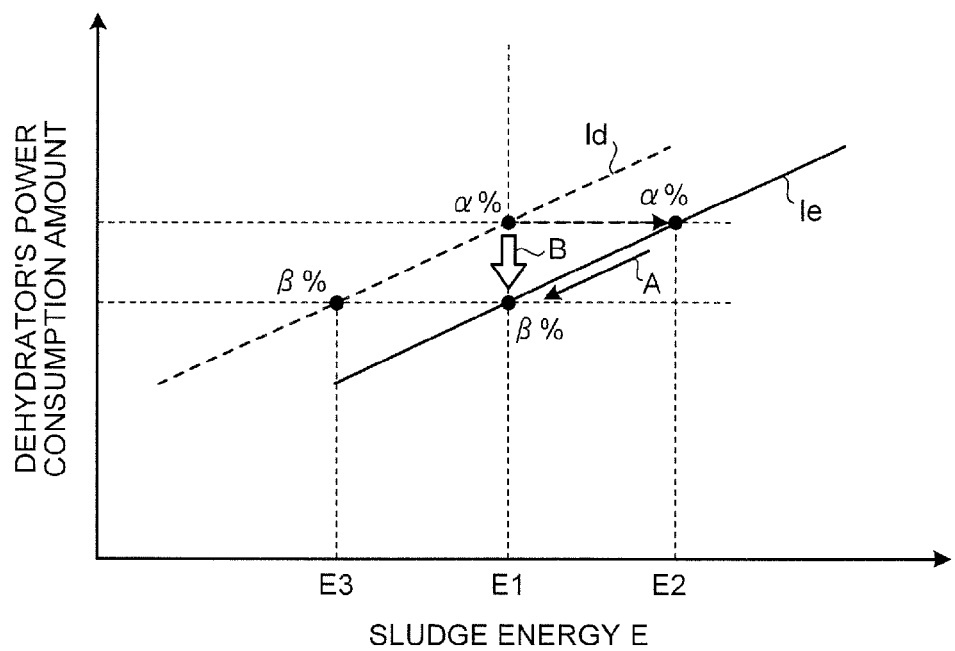
FIG. 4 is a graph showing a relationship between a power consumption amount of a moisture-reducing equipment and sludge energy according to the embodiment of the present invention.

Hereafter a relationship between the power consumption amount of the moisture-reducing equipment 10 controlled by a signal fed by the moisture-reducing-operation-controlling section 35 and the sludge energy of the dehydrated sludge will be explained. FIG. 4 is a graph showing a relationship between the power consumption amount and the sludge energy. A case where varying the property of the sludge causes the sludge characteristics to vary from Id to Ie is considered in FIG. 4. In this case, even if the power consumption amount of the moisture-reducing equipment 10 is identical, that is, if the dehydration of the sludge remains the same and the moisture content is α%, the sludge energy E increases from E1 to D2 if the combustible components contained in the sludge increases. If a desirable sludge energy E is E1, it is necessary to decrease the sludge energy E from E2 to E1. In this case, the sludge energy E can be returned from E2 to E1 along an arrow A by decreasing the power consumption amount of the dehydrator 11 along an arrow B, to decrease the centrifugal force and a dehydration efficiency, and accordingly making the moisture content at β% that is higher than α% (α<β). As described above, controlling the power consumption amount of the dehydrator 11 to control the rotation rate allows an increase and a decrease in the moisture content of the sludge to be controlled, and thus allows the sludge energy E to be controlled toward the desirable sludge energy E1. On the contrary, if the sludge characteristics vary from Ie to Id, the sludge energy E can be controlled from E3 to E1 in a process reversed to the above-described process increasing the rotation rate of the dehydrator 11 to increase the dehydration efficiency.

As described above, since moisture-reducing-operation-controlling section 35 of the moisture-reducing equipment 10 is capable of controlling an increase and a decrease in the moisture content of the sludge to be subject to the dehydration, i.e., an increase and a decrease in the centrifugal force, by controlling an increase and a decrease in the rotation rate of the power source 12 of the dehydrator 11 via the dehydration controller 14 based on the latest estimated value of the sludge energy, the sludge energy E can be increased and decreased corresponding to the sludge characteristics.

Figure 5:
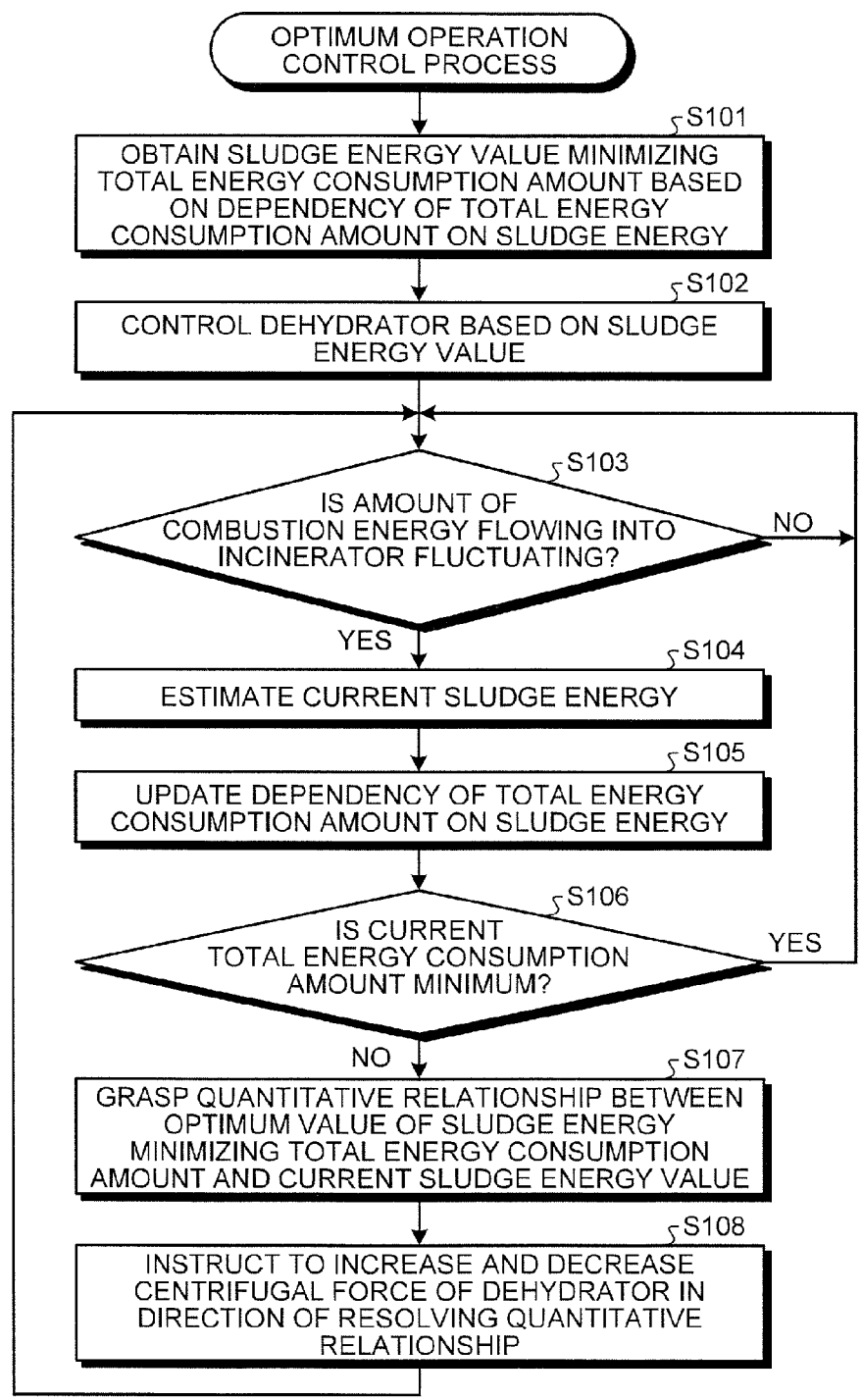
FIG. 5 is a flowchart of an optimum-operation control-processing method according to the embodiment of the present invention.

Hereafter a method of an optimum-operation-controlling-process by an optimum operation control apparatus 30 will be explained according to the embodiment of the present invention. FIG. 5 is a flowchart showing the method of an optimum-operation-controlling-process.

As shown in FIG. 5, in the present embodiment, to start with, the optimum operation control apparatus 30 obtains a sludge energy value E1min minimizing the total energy consumption amount P based on the reference relationship between the total energy consumption amount P and the sludge energy maintained by the relation-maintaining section 31 and based on that a sludge to be inputted is a standard sludge (the total energy consumption amount P takes the minimum value at the sludge energy value E1min) (Step S101).

Then the moisture-reducing-operation-controlling section 35 controls the rotation rate of the dehydrator 11 for the standard sludge to conduct a dehydration of the sludge (Step S102).

Then the process transfers to Step S103 in which the optimum operation control apparatus 30 determines as to whether an energy amount of combustion energy (combustion energy amount) is fluctuating which includes a flow rate of auxiliary fuel (auxiliary fuel consumption amount) fed into the fluidized incinerator 21 as an energy-consuming element and a flow rate and a temperature of flux air fed into the fluidized incinerator 21 (Step S103). In a case where a cooler for cooling the flux air is provided to the thermal operation equipment 20, a feed amount of cooling air or an amount of wattage or the like of the cooler by a supplied amount control may be employed as the combustion energy for conducting the supplied amount control for the cooling air.

In a case where the combustion energy amount based on the auxiliary fuel or the flux air fluctuates (Step S103, Yes), the process transfers to Step S104. In the Step S104, the sludge energy estimation section 32 of the optimum operation control apparatus 30 calculates and estimates the sludge energy value $E_{es}$ of the sludge fed into the fluidized incinerator 21 at this point from a total heat amount of the combustion energy flowing into the fluidized incinerator 21 and a total heat amount of gas discharged from the fluidized incinerator 21 (Step S104). The estimated sludge energy value $E_{es}$ is stored in a predetermined recording area.

After that, the total-energy-consumption-amount-measuring section 33 of the optimum operation control apparatus 30 measures an energy consumption amount for each energy-consuming element based on data fed from respective elements of the sludge-processing apparatus and totals measured results to measure the total energy consumption amount P. Then an interpolation is conducted from past data or the like based on the latest sludge energy value $E_{es}$ estimated at the Step S104 and the total energy consumption amount P at that point. Hereby the reference relationship between the total energy consumption amount P and the sludge energy relative to the relationship between the total energy consumption amount P and the sludge energy as the correlation calculated in advance and shown in FIG. 2 is corrected and updated successively. At this time, the optimum value of the sludge energy minimizing the total energy consumption amount P (sludge energy value E1min) is also derived. The updated reference relationship between the total energy consumption amount P and the sludge energy is stored by the relation-maintaining section 31 and capable of being read out. In a case where the correlation between the sludge energy and the total energy consumption amount as shown in FIG. 2 is not calculated in advance, the reference relationship between the total energy consumption amount P and the sludge energy shown in FIG. 2 is derived by structuring, and further correcting, the relationship between the total energy consumption amount P and the sludge energy successively by making use of the correlation between the estimated value of the sludge energy estimated by the sludge energy estimation section 32 and the measured value of the total energy consumption amount measured by the total-energy-consumption-amount-measuring section 33 from the beginning of an operation of the sludge-processing apparatus 1.

After that, the optimum operation control apparatus 30 determines as to whether the current total energy consumption amount P is the minimum value based on the reference relationship between the total energy consumption amount P and the sludge energy stored by the above-described relation-maintaining section 31 (Step S106).

In a case where the current total energy consumption amount P is not the minimum value (Step S106, No), the quantitative-relationship-grasping section 34 of the optimum operation control apparatus 30 calculates and grasps a quantitative relationship between an estimated value $E_{es}$ of the sludge energy estimated at the Step S104 and the optimum value E1min of the sludge energy derived at the Step S105 (Step S107).

Figure 6:
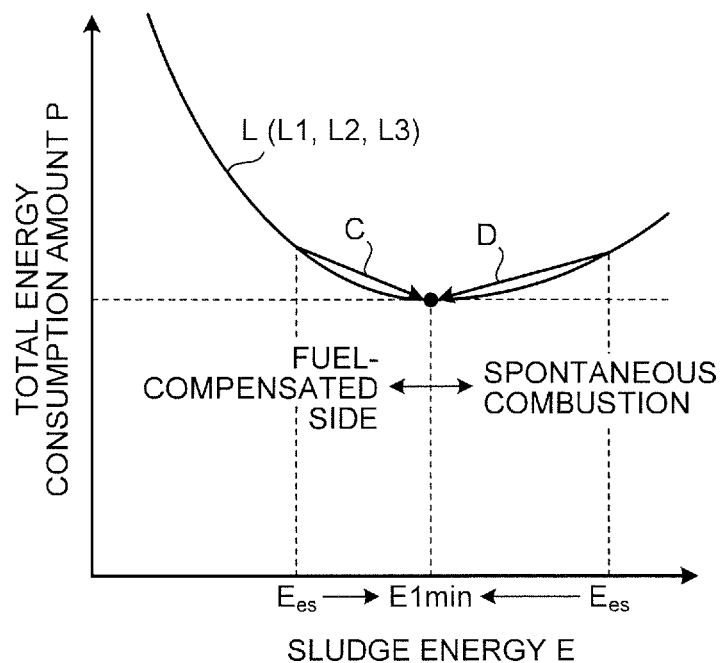
FIG. 6 is a graph showing a scheme of relationship between total energy consumption amount and sludge energy according to the embodiment of the present invention.

Then the moisture-reducing-operation-controlling section 35 of the optimum operation control apparatus 30 controls the dehydrator 11 to increase and decrease the centrifugal force in a direction in which the estimated sludge energy causes the total energy consumption amount P to be minimized, i.e., in the direction of resolving the quantitative relationship by controlling the dehydration controller 14 controlling the dehydrator 11 (Step S108). Herein FIG. 6 is a graph simplifying graphs for the curves L, L1, L2, and L3 or the like shown in FIG. 2 showing the reference relationship between the total energy consumption amount P and the sludge energy according to the embodiment. As shown in FIG. 6, in a case where the estimated sludge energy value $E_{es}$ is smaller than the optimum value E1min of the sludge energy, the dehydrator 11 is controlled so that the sludge energy increases toward a spontaneous combustion side along an arrow C. On the other hand, in a case where the estimated sludge energy value $E_{es}$ is larger than the optimum value E1min of the sludge energy, the dehydrator 11 is controlled so that the sludge energy decreases toward a fuel-compensated side along an arrow D. In FIG. 6, the spontaneous combustion side indicates an area in a spontaneous combustion state, and the fuel-compensated side indicates an area requiring an auxiliary fuel. The sludge energy E1min minimizing the total energy consumption amount P is close to the sludge energy value at which the spontaneous combustion state is switched to, or from, the fuel-compensated state. However, the spontaneous combustion state is not switched to, or from, the fuel-compensated state clearly before or after the total energy consumption amount P is minimized.

After that, the process transfers to the Step S103 in which the treatments of the above-described Steps S103 to S108 are repeated. In the above-described Steps S103 to S108, it is preferable that specifically the Step S103 is executed at a predetermined time interval. For the time interval, a transportation time or the like for the sludge being transported between the dehydrator 11 and the fluidized incinerator 21 can be used, and an appropriate time interval can be set in accordance with a design of the sludge-processing apparatus 1.

In a case where the combustion energy amount does not fluctuate based on the auxiliary fuel or the flux air in the Step S103 (Step S102, No), the Step S103 is repeated until the fluctuation of the combustion energy amount occurs. In a case where the current total energy consumption amount P is of the minimum value in the Step S106 (Step S106, Yes), the optimum operation control apparatus 30 returns the process back to the Step S103 without instructing to the dehydration controller 14 to increase or decrease the power consumption amount.

According to the above-described embodiment of the present invention, since the operation of the moisture-reducing equipment 10 is controlled so that the sludge energy value is obtained at which the total energy consumption amount P of the entire sludge-processing apparatus 1 is minimized without measuring the moisture content or the combustible components or the like of the incinerated sludge, the energy efficiency of the entire sludge-processing apparatus 1 can be in the optimized state constantly even if the characteristics of the sludge vary and the sludge characteristics vary.

According to the embodiment of the present invention, the sludge energy can be controlled to reach the optimum value by the dehydrator 11 of the moisture-reducing equipment 10 so that the total energy consumption amount P is constantly directed to the minimum value. That is, as described above, although the sludge energy value E1min in FIG. 6 is close to the sludge energy value at which the spontaneous combustion state is switched to, or from, the fuel-compensated state, the spontaneous combustion state is not switched to, or from, the fuel-compensated state clearly prior to or subsequent to the sludge energy value. Therefore, even if an operator or the like identifies the spontaneous combustion state from the fuel-compensated state or vice versa and if an increase or a decrease in the power consumed by the moisture-reducing equipment 10 is controlled by a manual operation according to the identified state, it is extremely difficult to minimize the total energy consumption amount P. On the contrary, since the dehydrator 11 according to the embodiment is controlled so that the sludge energy is estimated and the sludge energy varies in the direction in which the current total energy consumption amount P decreases, it is possible to configure that the total energy consumption amount P is directed to be minimized constantly.

Figure 7:
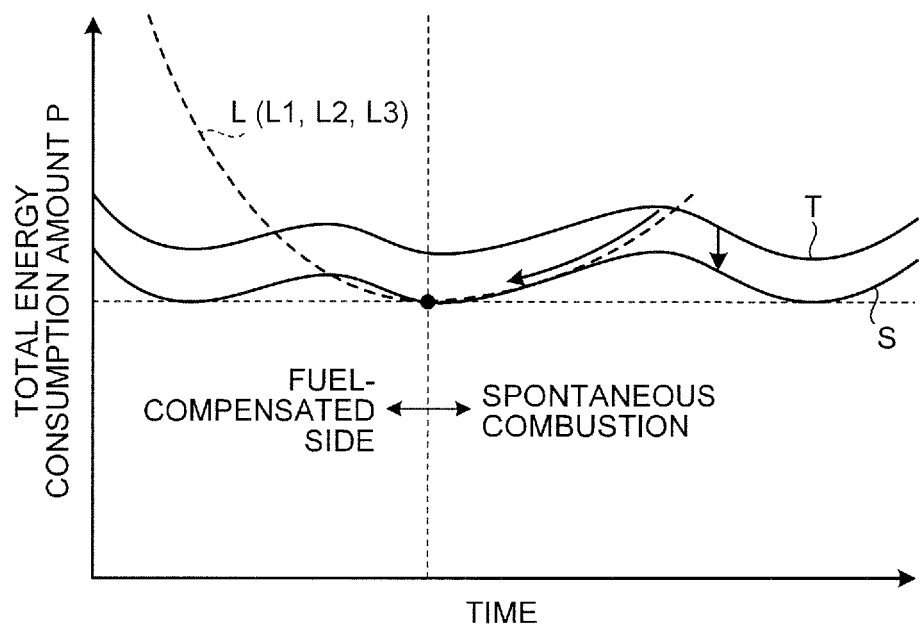
FIG. 7 is a graph for explaining fluctuation of the total energy consumption amount over time according to the embodiment of the present invention.

According to the embodiment of the present invention, it is possible to reduce energy. FIG. 7 is a graph showing an example of a chronological fluctuation of the total energy consumption amount P. In FIG. 7, a curve T indicates a chronological fluctuation of the total energy consumption amount P by a conventionally controlled moisture-reducing-and-thermal operating equipment, and a curve S indicates a chronological fluctuation of the total energy consumption amount P by the optimum operation control according to the embodiment. As shown in FIG. 7, since the moisture-reducing equipment 10 is controlled so that the total energy consumption amount P is directed to be of the minimum value constantly in accordance with the fluctuation of the amount of the combustion energy fed to the fluidized incinerator 21 of the thermal operation equipment 20, it is possible to fluctuate the total energy consumption amount P at a low value. Therefore, a portion of energy corresponding to an area between the curve T and the curve S within an arbitrary time period can be reduced in the sludge-processing apparatus 1.

The entire equipment in the organic-waste-processing apparatus can be reduced in size than that of a conventional equipment. That is, an incinerator such as the conventional fluidized incinerator 21 or the like was necessary to be capable of corresponding to the moisture content of the sludge and the amount of heat of the incinerator at a wide range. Therefore, since it was necessary to design a specification satisfying a wider range of the relationship between the moisture content of the sludge and the amount of heat produced by the incinerator, the incinerator was inevitably over engineered. On the contrary, according to the present embodiment, since the range, which the incinerator such as the fluidized incinerator 21 or the like is capable of corresponding to, of the moisture content of the sludge can be reduced and also the range corresponding to the amount of heat produced by the incinerator can be reduced, a narrower range of specification can be designed relating to the relationship between the moisture content of the sludge and the amount of the produced heat, and thus the entire equipment in the organic-waste-processing apparatus can be reduced in size.

Figure 8:
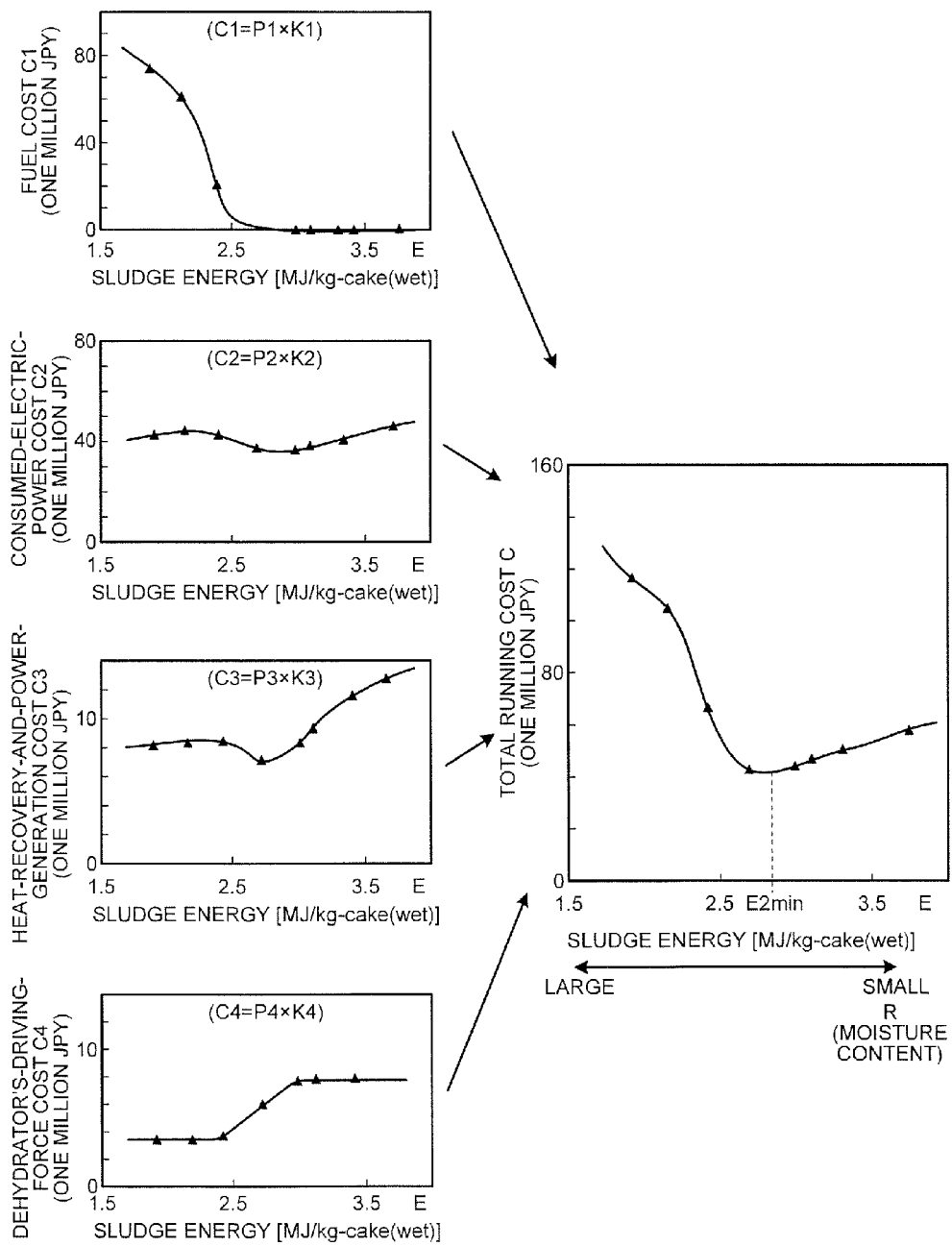
FIG. 8 is a diagram showing general scheme of an optimum-operation control process according to a modification example 1 of the embodiment of the present invention.

Although, in the above-described embodiment, the moisture content R is controlled to increase or decrease to obtain the sludge energy value E1min so that the total energy consumption amount P is minimized, in the modification example 1 shown in FIG. 8, the centrifugal force of the dehydrator 11 is controlled to be increased or decreased so that a sludge energy value E2min is obtained so that a total running cost C is minimized which is obtained by multiplying the fuel consumption amount P1, the power consumption amount P2, the amount of thermally-regenerated power P3, and the power source's energy-consumption amount P4 by weight coefficients K1 to K4 to be converted to running costs respectively, and by subtracting a heat-recovery-and-power-generation cost C3 from the total of a fuel cost C1, a consumed-electric-power cost C2, and a dehydrator's-driving-force cost C4. Hereby an optimum control can be conducted to minimize a running cost of the entire sludge-processing apparatus 1.

Figure 9:
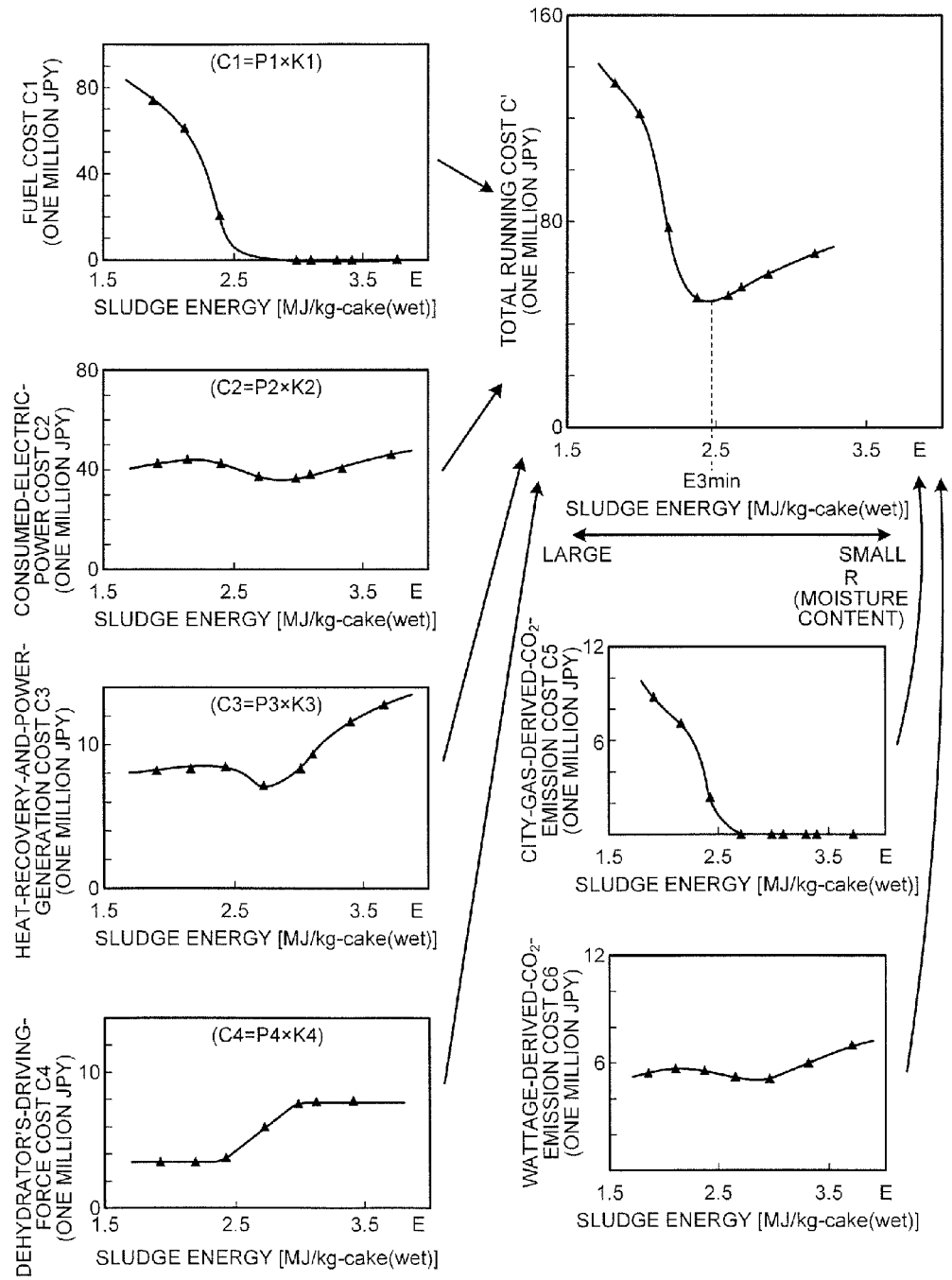
FIG. 9 is a diagram showing a general scheme of an optimum-operation control process according to a modification example 2 of the embodiment of the present invention.

In the modification example 2, as shown in FIG. 9, a green-house-effect-gas-discharging cost is considered by adding a city-gas-derived-$CO_2$-emission cost C5 and a wattage-derived-$CO_2$-emission cost C6 to the total running cost C of the modification example 1 to obtain a total running cost C', and the dehydrator 11 is controlled to increase and decrease the centrifugal force so that a sludge energy value E3min minimizes the total running cost C'. The city-gas-derived-$CO_2$-emission cost C5 is a cost of $CO_2$ emission amount produced by a city gas as an auxiliary fuel, and the wattage-derived-$CO_2$-emission cost C6 is a cost of $CO_2$ emission amount when producing a power used for a blower or the like.

Figure 10:
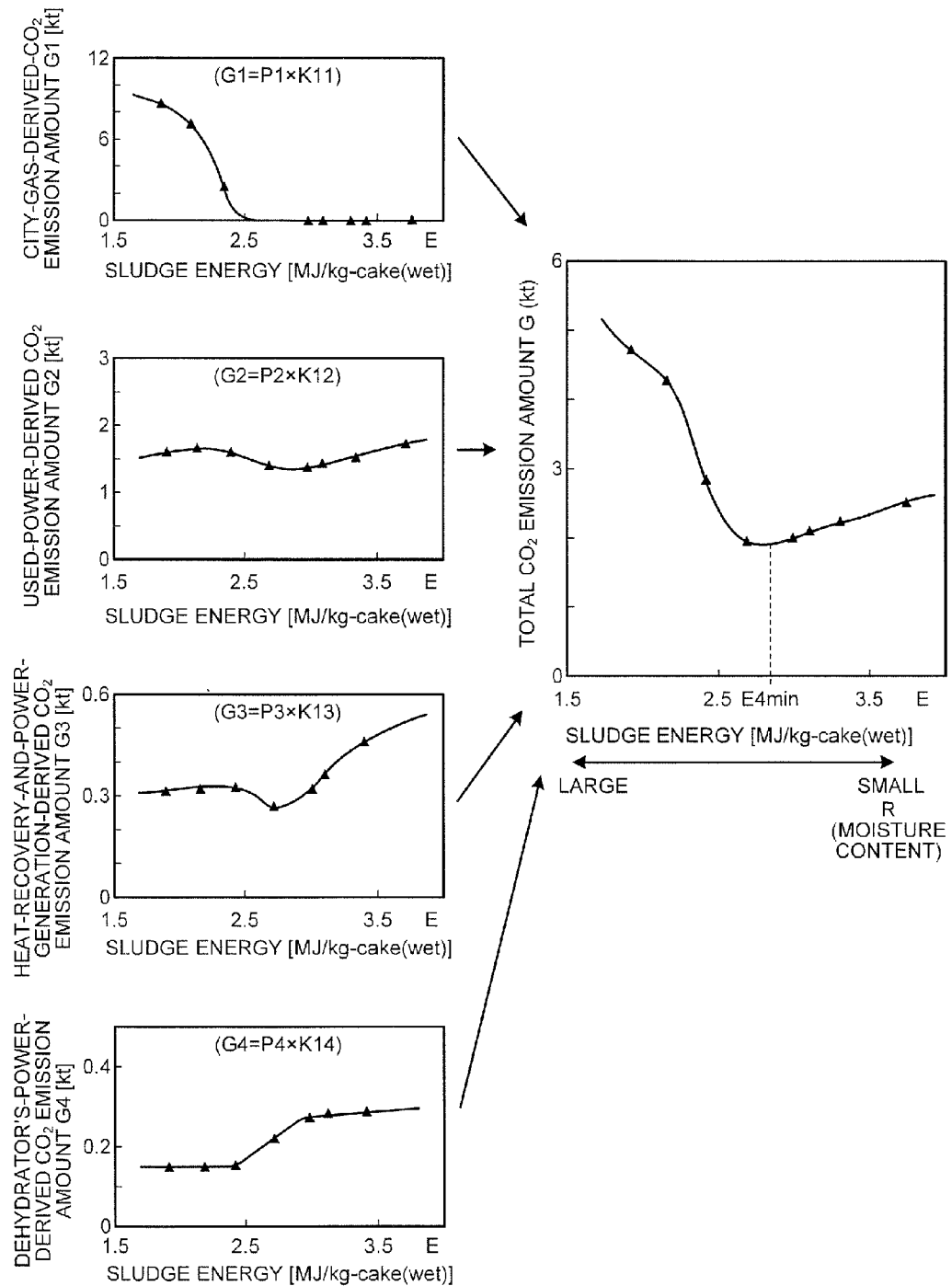
FIG. 10 is a diagram showing a general scheme of an optimum-operation control process according to a modification example 3 of the embodiment of the present invention.

In the modification example 3 shown in FIG. 10, the centrifugal force of the dehydrator 11 is controlled to increase or decrease the centrifugal force so that a sludge energy value E4min is obtained so that a total $CO_2$ emission amount G is minimized which is obtained by multiplying the fuel consumption amount P1, the power consumption amount P2, the thermally-regenerated power amount P3, and the power source's energy-consumption amount P4, as amounts consumed by the respective energy elements, by weight coefficients K11 to K14 in place of the above-described weight coefficients K1 to K4 to be converted to $CO_2$ emission amounts respectively, and by subtracting a heat-recovery-and-power-generation-derived $CO_2$ emission amount G3 from the total of a multiplied city-gas-derived-$CO_2$ emission amount G1, a multiplied consumed-power-derived $CO_2$ emission amount G2, and a multiplied dehydrator's-power-derived $CO_2$ emission amount G4 respectively. Hereby an optimum control can be conducted to minimize the $CO_2$ emission amount of the entire sludge-processing apparatus 1.

The embodiment of the present invention was explained above specifically, and the present invention is not limited to the above-described embodiment, and various modifications are possible based on a technical idea of the present invention. For example, numbers described in the above-described embodiments are mere examples, a number which is other than the above-described numbers may be used if necessary.

To be more specific, for example, although the optimum operation control apparatus 30 according to the above-described embodiment is configured to control an increase and a decrease of a power consumption amount of the dehydrator 11 by considering a wattage of the sludge supply pump as a part of the power source's energy-consumption amount P4 and the power consumption amount P2 at a side of the moisture-reducing equipment 10, the dehydrator 11 may be controlled based on only the energy-consuming element at a side of the thermal operation equipment 20 without considering the energy-consuming element at the side of the moisture-reducing equipment 10 of these.

In a case where the sludge-processing apparatus 1 according to the above-described embodiment uses an energy element that is other than the above-described fuel consumption amount P1, the power consumption amount P2, the thermally-regenerated power amount P3, and the power source's energy-consumption amount P4, the dehydrator 11 may be controlled by considering a relationship between an amount consumed by the energy-consuming element and a sludge energy additionally. The consumption amount of the energy-consuming element is, for example, a fuel consumption amount of other type or a power consumption amount or the like of other equipment.

A weight coefficient converting to an energy-related category that is other than those explained in the above-described modification examples 1 to 3 may be used. For example, a weight coefficient may convert to a sales price value. Furthermore, since the sales price value can be added to a running cost, for example, the sales price value may be converted to an electricity-selling price without being converted to a heat-recovery-and-power-generation cost. This is because a consumed-electricity cost and the electricity-selling price differ in their conversion coefficients in many cases.

Although an optimal state is not limited to a minimized state in the above-described embodiment and the modification examples 1 to 3 and may be a maximized state.

A state in which the total energy consumption amount P, the total running costs C and C', and the total $CO_2$ emission amount G are minimized is not necessarily the spontaneous combustion state, and sludge energy values corresponding to respective the minimized values are not necessarily identical.

Although the optimum operation control apparatus 30 is not limited to a configuration of being independent to the moisture-reducing equipment 10 and the thermal operation equipment 20 according to the above-described embodiment and the modification examples 1 to 3, and functions of the optimum operation control apparatus 30 may be provided at a side of the moisture-reducing equipment 10 or the thermal operation equipment 20.

Equal to or greater than two of the above-described respective energy-consuming elements can be combined arbitrarily.

Although the control of the sludge energy is not necessarily limited to the above-described embodiment varying the moisture content of the sludge by controlling the centrifugal force of the dehydrator, and various controls can be executed if the sludge energy is increased and decreased variably. To be more specific, a method of increasing and decreasing the sludge energy by controlling an amount of consumed power or a differential velocity of the dehydrator directly, or a method of instructing the dehydrator having a moisture-content-controller for controlling the moisture content of the sludge to merely increase and decrease the moisture content indirectly, may be employed.

In the above-described embodiment, an incinerator such as a recycling incinerator or the like of a type that is other than a fluidized incinerator may be used as a combustion unit, and a gasification furnace or a carbonization furnace or the like may be selected appropriately in accordance with a purpose of a thermal operation. The thermal operation equipment 20 is not limited to an incinerating equipment including an incinerator conducting an incinerating process and may be an equipment including a sludge gasification furnace or a sludge-fuelizing (carbonizing) furnace.

In the above-described embodiment, the heat-recovery-and-power-generation equipment 27 may put out a rotation force of a turbine rotated by a thermally regenerated energy directly as a driving force.

Furthermore, the heat-recovery-and-power-generation equipment 27 may use a flux air heat-exchanged by the flux air pre-heater 23 at an upstream of the flux air pre-heater 23 as a heat source or may use a flux air obtained in parallel with the flux air at the upstream of the flux air pre-heater 23 as a heat source.

The organic-waste-processing apparatus, the processing method, and the control apparatus according to the present invention are capable of optimizing the state of the energy usage efficiency of the entire processing apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An organic-waste-processing apparatus reducing a moisture of, and conducting a thermal operation process to, an organic waste, comprising:
   a moisture-reducing unit reducing the moisture of the organic waste;
   a combustion unit combusting and reducing a weight of the organic waste moisture-reduced by the moisture-reducing unit by using a combustion energy;
   a combustion-energy-supply unit supplying the combustion energy, which is other than a combustion energy residing in the organic waste, into the combustion unit;
   an energy-supply-operation controller controlling an operation of the combustion-energy-supply unit so that a supply of the combustion energy is controlled such that an inside of the combustion unit is maintained at a predetermined temperature; and a control apparatus for controlling the moisture-reducing unit;

wherein the control apparatus includes:

an organic-waste-energy-estimating unit calculating an organic waste energy as the combustion energy residing in the organic waste based on a supply amount of the combustion energy as a result of a control by the energy-supply-operation controller;

a total-energy-consumption measuring unit measuring a total energy consumption amount by measuring energy consumption amounts for a plurality of energy-consuming elements relating to the moisture reduction and the thermal operation process of the organic waste and totaling results of measuring the energy consumption amounts;

a relation-maintaining unit storing a first correlation between an organic waste energy calculated in advance and the total energy consumption amount, a second correlation between the organic waste energy and a measured value of the total energy consumption amount obtained by correcting the first correlation continuously based on a third correlation between an estimated value of the organic waste energy calculated by the organic-waste-energy-estimating unit and a measured value of the total energy consumption amount measured by the total-energy-consumption measuring unit, or a fourth correlation between the organic waste energy and the total energy consumption amount obtained by structuring and correcting continuously by the third correlation, as a reference relationship between the organic waste energy and the total energy consumption amount;

a quantitative-relationship-grasping unit calculating a quantitative relationship between an optimum value of the organic waste energy minimizing the total energy consumption amount and a latest estimated value of the organic waste energy based on the reference relationship stored by the relation-maintaining unit between the organic waste energy and the total energy consumption amount and the latest estimated value of the organic waste energy calculated by the organic-waste-energy-estimating unit; and a moisture reduction controller controlling an operation of the moisture-reducing unit so that the estimated value of the organic waste energy to be calculated by the organic-waste-energy-estimating unit is directed in a direction reducing a quantitative difference from the optimum value of the organic waste energy based on the quantitative relationship calculated by the quantitative-relationship-grasping unit between the optimum value of the organic waste energy and the latest estimated value of the organic waste energy.

2. The organic-waste-processing apparatus according to claim 1, wherein the combustion energy, which is other than the combustion energy residing in the organic waste is based on a flow amount of an auxiliary fuel fed to the combustion unit and a flow amount and a temperature of a combustion air.

3. The organic-waste-processing apparatus according to claim 1, wherein an energy consumption amount of an energy-consuming element includes at least one of an auxiliary fuel consumption amount of the combustion unit, an actual power consumption amount from which a recovered-heat-generated power amount is subtracted, a power source's energy, and a power of an organic-waste-supplying pump.

4. The organic-waste-processing apparatus according to claim 1, wherein the total energy consumption amount is obtained by totaling values to which conversion weight coefficients are multiplied for predetermined energy-related categories corresponding to each energy-consuming element of the plurality of energy-consuming elements.

5. The organic-waste-processing apparatus according to claim 4, wherein the conversion weight coefficients converts each energy-consuming element to a running cost.

6. The organic-waste-processing apparatus according to claim 4, wherein the conversion weight coefficients converts each energy-consuming element to a sales price value.

7. The organic-waste-processing apparatus according to claim 4, wherein the conversion weight coefficients convert each energy-consuming element to a $CO_2$ emission amount.

8. An organic-waste-processing method reducing a moisture of, and conducting a thermal operation process to, an organic waste, to be performed by a control apparatus comprising an organic-waste-energy-estimating unit; a total-energy-consumption measuring unit; a relation-maintaining unit; a quantitive-relationship grasping unit; and a moisture reduction controller; the organic-waste-processing method comprising steps of:

reducing the moisture of the organic waste by a moisture-reducing unit;

combusting and reducing a weight of the moisture-reduced organic waste by a combustion unit by using a combustion energy;

supplying the combustion energy, which is other than a combustion energy residing in the organic waste, by a combustion-energy-supply unit into the combustion unit;

controlling a supply of the combustion energy by energy supply operation controller such that an inside of the combustion unit is maintained at a predetermined temperature;

calculating, in the organic-waste-energy-estimating unit, an organic waste energy as the combustion energy residing in the organic waste based on a supply amount of the combustion energy as a result of a control at the step of controlling the supply of the combustion energy;

measuring, in the total-every-consumption measuring unit, a total energy consumption amount by measuring energy consumption amounts for a plurality of energy-consuming elements relating to the moisture reduction and the thermal operation process of the organic waste and totaling results of the energy consumption amounts;

storing, in the relation-maintaining unit, a first correlation between the organic waste energy calculated in advance and the total energy consumption amount, a second correlation between the organic waste energy and the total energy consumption amount obtained by correcting the first correlation continuously based on a third correlation between an estimated value of the organic waste energy calculated at the step of calculating the organic waste energy and a measured value of the total energy consumption amount measured at the step of measuring the total energy consumption amount, or a fourth correlation between the organic waste energy and the total energy consumption amount obtained by structuring and correcting continuously by the third correlation, as a reference relationship between the organic waste energy and the total energy consumption amount;

calculating, in the quantitive-relationship-grasping unit, a quantitative relationship between an optimum value of the organic waste energy minimizing the total energy consumption amount and a latest estimated value of the organic waste energy based on the reference relationship stored at the step of storing the relation between the organic waste energy and the total energy consumption amount and the latest estimated value of the organic waste energy calculated in the organic waste energy calculating step; and controlling, in the moisture reduction controller, an operation of the moisture-reducing unit so that the estimated value of the organic waste energy to be calculated at the step of calculating the organic waste energy is directed in a direction reducing a quantitative difference from the optimum value of the organic waste energy based on the quantitative relationship calculated at the step of calculating the quantitative relationship between the optimum value of the organic waste energy and the latest estimated value of the organic waste energy.

9. A control apparatus for controlling a moisture-reducing unit, the moisture-reducing unit reducing a moisture of an organic waste, the control apparatus comprising:

an energy-supply-operation controller controlling an operation of a combustion-energy-supply unit supplying a combustion energy, which is other than a combustion energy residing in the organic waste, to a combustion unit combusting and reducing a weight of the organic waste moisture-reduced by the moisture-reducing unit by using the combustion energy, so that a supply of the combustion energy is controlled such that an inside of the combustion unit combusting the organic waste is maintained at a predetermined temperature;

an organic-waste-energy-estimating unit calculating an organic waste energy as the combustion energy residing in the organic waste based on a supply amount of the combustion energy as a result of a control by the energy-supply-operation controller;

a total-energy-consumption measuring unit measuring a total energy consumption amount by measuring energy consumption amounts for a plurality of energy-consuming elements relating to the moisture reduction and the thermal operation process of the organic waste and totaling results of measuring the energy consumption amounts;

a relation-maintaining unit storing a first correlation between an organic waste energy calculated in advance and the total energy consumption amount, a second correlation between the organic waste energy and the total energy consumption amount obtained by correcting the first correlation continuously based on a third correlation between an estimated value of the organic waste energy calculated by the organic-waste-energy-estimating unit and a measured value of the total energy consumption amount measured by the total-energy-consumption measuring unit, or a fourth correlation between the organic waste energy and the total energy consumption amount obtained by structuring and correcting continuously by the third correlation, as a reference relationship between the organic waste energy and the total energy consumption amount;

a quantitative-relationship-grasping unit calculating a quantitative relationship between an optimum value of the organic waste energy minimizing the total energy consumption amount and a latest estimated value of the organic waste energy based on the reference relationship stored by the relation-maintaining unit between the organic waste energy and the total energy consumption amount and the latest estimated value of the organic waste energy calculated by the organic-waste-energy-estimating unit; and a moisture reduction controller controlling an operation of the moisture-reducing unit so that the estimated value of the organic waste energy to be calculated by the organic-waste-energy-estimating unit is directed in a direction reducing a quantitative difference based on the quantitative relationship calculated by the quantitative-relationship-grasping unit between the optimum value of the organic waste energy and the latest estimated value of the organic waste energy.

* * * * *